UNITED STATES PATENT OFFICE.

FRITZ PFLEUMER, OF DRESDEN, GERMANY.

MANUFACTURING FROTH FILLINGS.

1,167,518.  Specification of Letters Patent.  Patented Jan. 11, 1916.

No Drawing.   Application filed August 12, 1912.  Serial No. 714,611.

*To all whom it may concern:*

Be it known that I, FRITZ PFLEUMER, a subject of the Emperor of Austria-Hungary, residing at Dresden, Germany, have invented certain new and useful Improvements in Manufacturing Froth Fillings, of which the following is a specification.

This invention relates to the manufacture of froth fillings for tires and the like by vulcanizing the material (india rubber, guttapercha, or balata) at about 136° C., cooling the same, and subsequently maintaining it for a lengthy period under high gas pressure.

The preferred raw materials for the manufacture of such fillings are balata, and guttapercha freed from resinous constituents. In soft vulcanized condition these materials possess a high tensile strength, and when brought into frothy form can withstand comparatively high internal pressure of the gas filling.

The drawbacks attending the use of this filling as hitherto manufactured are due to the fact that it is not advisable to compress the froth after it has been expanded to atmospheric pressure, for the purpose of obtaining higher gas pressure. In practice this is possible only to quite small pressures of about 1½ atmospheres, since considerable difficulties are encountered in forcing greater volumes of the froth into an envelop, such as a tire tube. Moreover the froth containing gas under pressure was manufactured in such a manner that it was not at once expanded after the vulcanization, but allowed to cool under pressure for several hours. If the froth is to be used as tire filling, then, although the material already contains gas under pressure, it is necessary to give it a somewhat greater volume than that corresponding to the space it occupies inside the tire; otherwise the filling would work loose in the tire during running, and the resulting friction between the tire and the filling would soon destroy the latter. For the same reason it is necessary to allow the filling the possibility of expansion in view of the expansion of the tire. The application of such froth containing gas under pressure, under these conditions is attended with several drawbacks in practice. First, as soon as a high gas pressure obtains in the tire it is very difficult to properly force sufficient fillings into the tire and confine the same therein by the ordinary method of urging the free edges of the tire toward each other. Secondly, a froth filling manufactured in this manner is continuously stressed, that is each film is continuously subjected to the effect of a tension originating from the internal pressure of the gas filling. This tension is greatly increased by the effect of mechanical working when the filled tire is in action. Since this filling is stressed by its expansion nearly to the permissible limits, the additional effects due to the working of the tire increase the stress much beyond the allowable continuous load. In fact it is found that the filling used in tensioned condition is destroyed after quite a short life (in bicycles 600-1000 km.). Thirdly, with fillings brought into position by the forcing together of the tire edges or beadings, these latter do not lie properly; their inner edges tend to project upward into the inside of the tire instead of lying along the bottom of the rim, that is they tend to curl when placed into position in such a manner that in certain circumstances they do not provide a secure hold against the edge of the rim. The result is an unfavorable stressing of the edges of the tire and the danger of the same slipping out of the rim grooves when driving around sharp curves.

The object of the present invention is a process for the manufacture of a froth filling for wheel tires which contains in itself the necessary amount of gas for the inflation of the tire, although before being put in position the filling has a volume as small as that of the interior of the tire; the filling after being placed in position being released from the tension resulting from the compressed gas.

The invention consists substantially in a process of the kind referred to in which the filling material is cooled under a gas pressure equal to or higher than that of the vulcanization. For example if the vulcanization is carried out at a pressure of 320 atmospheres (measured hot) the gas pressure after vulcanization may be raised to 350 atmospheres (measured cold) if necessary by forcing additional gas into the vulcanizing chamber. The material treated in this manner, after being released from the gas pressure, expands appreciably less than when made in the hitherto customary manner, while it contains gas at higher pressure, since the absorption of gas by materials of the same nature remains sensibly constant.

In this manner there can be easily manufactured a filling which after the removal of the external gas pressure contains a much greater internal pressure than that corresponding to the pressure in the tire. It is thus easy to accommodate the necessary amount of filling in the tire for the inflation of the same and the insertion of the filling offers no difficulties, its volume being smaller than the space within the tire. It is thus possible to lodge the beadings or edges of the tire in their correct positions, and if necessary to secure the cover by means of thumb screws.

After the insertion of the filling the tire is heated in a closed box, preferably by means of hot air, to 70 to 90° C. for a half to one hour according to the size of section. Owing to the effect of the heat the filling material becomes plastic, so that it is expanded by the gas occluded therein until it bears firmly against the inside of the cover and stretches the same stiffly. The tension is now, in distinction to the previously described methods of inserting the filling, removed from the filling and transmitted to the fabric of the cover, whereby the latter is powerfully stretched. Owing to this the expansion of the filling is available for the working efforts, that is the filling is no longer over-stressed even by considerable stresses due to working, and withstands these loads permanently without becoming destroyed. Furthermore the beadings lodge correctly in the grooves of the rim, since the inflation of the tire is not materially different from the inflation of an ordinary pneumatic tire.

The above mentioned effect of relieving the filling from the tension and the transmitting of the same to the fabric of the cover can be still further increased by subjecting the tire while still heated to a vacuum. The effective pressure of the filling is then increased by one atmosphere, the cover still further stretched, and the filling still further relieved of tension, so that the filling after removal from the vacuum is not subjected to expansion even when the cover is loaded.

Tire fillings manufactured in this manner possess a high degree of elasticity, are exceptionally light running, and have a much longer life than the fillings previously used. The expansion caused by the working of the tire has only a small effect on the conditions of pressure of the tire.

Various modifications and changes may be made in my process, such as the material can be partly vulcanized instead of raw, and the material can be cooled under a cool gas pressure higher than the hot high gas pressure previously applied during vulcanization, without departing from the spirit of the invention or sacrificing any of its advantages.

Having thus fully described my invention, what I claim as new and desire to secure by Letters Patent is:

1. The process of manufacturing froth fillings which comprises the steps of vulcanizing vulcanizable material under a hot high gas pressure, then cooling the same under a cool gas pressure at least equal to the gas pressure applied during vulcanization, inserting the cooled filling into a casing, and then heating the filled casing to expand the filling until it occupies the interior of the casing.

2. The process of manufacturing froth fillings which comprises the steps of vulcanizing vulcanizable material under a hot high gas pressure, then cooling the same under a cool gas pressure at least equal to the gas pressure applied during vulcanization, inserting the cooled filling into a casing, heating the casing and subjecting the heated casing to a vacuum to further expand the filling.

3. The process of manufacturing froth fillings which comprises the steps of vulcanizing vulcanizable material under a hot high gas pressure, then cooling the same under a cool gas pressure higher than the gas pressure applied during vulcanization, inserting the cooled filling into a casing, and then heating the filled casing to expand the filling until it occupies the interior of the casing.

4. The process of manufacturing froth fillings which comprises the steps of vulcanizing vulcanizable material under a hot high gas pressure, then cooling the same under a cool gas pressure higher than the gas pressure applied during vulcanization, inserting the cooled filling into a casing, heating the casing and subjecting the heated casing to a vacuum to further expand the filling.

In testimony whereof I affix my signature in presence of two witnesses.

FRITZ PFLEUMER.

Witnesses:
PAUL ARRAS,
CLARE SIMON.